US012019405B2

(12) United States Patent

Nicolas et al.

(10) Patent No.: US 12,019,405 B2

(45) Date of Patent: Jun. 25, 2024

(54) DEVICE FOR WINDING OR SETTING AND FOR VERIFYING A WATCH

(71) Applicant: The Swatch Group Research and Development Ltd, Marin (CH)

(72) Inventors: Cédric Nicolas, Neuchâtel (CH); Jérôme Favre, Neuchâtel (CH); Jean-Jacques Born, Morges (CH); Hicham Farah, Sonceboz-Sombeval (CH)

(73) Assignee: The Swatch Group Research and Development Ltd, Marin (CH)

(*) Notice: Subject to any disclaimer, the term of this patent is extended or adjusted under 35 U.S.C. 154(b) by 260 days.

(21) Appl. No.: 17/456,613

(22) Filed: Nov. 26, 2021

(65) Prior Publication Data

US 2022/0382221 A1 Dec. 1, 2022

(30) Foreign Application Priority Data

May 28, 2021 (EP) .................................... 21176611

(51) Int. Cl.

*G04D 7/00* (2006.01)
*G04B 3/00* (2006.01)
*G04C 1/04* (2006.01)

(52) U.S. Cl.

CPC ............ *G04D 7/009* (2013.01); *G04B 3/006* (2013.01); *G04C 1/04* (2013.01)

(58) Field of Classification Search

CPC . G04B 3/00; G04B 3/006; G04B 9/00; G04B 9/005; G04C 1/04

See application file for complete search history.

(56) References Cited

U.S. PATENT DOCUMENTS

| | | | | |
|---|---|---|---|---|
| 2014/0003200 | A1 | 1/2014 | Lamarche | |
| 2019/0121297 | A1* | 4/2019 | Buehler | G04D 7/006 |
| 2020/0133203 | A1 | 4/2020 | Ando | |

FOREIGN PATENT DOCUMENTS

| | | | |
|---|---|---|---|
| WO | WO 2012/126978 | A1 | 9/2012 |

OTHER PUBLICATIONS

European Search Report dated Oct. 11, 2021 in European Application 21176611.8, filed on May 28, 2021, 3 pages (with English Translation of Categories of cited documents).

* cited by examiner

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A device is disclosed for verifying the state of a watch and resetting it to the correct time. In a case of the device, a watch can be disposed on a watch support, which can be moved from a position without measurement to a measurement position in a vision system, or vice versa. In a position without measurement, the watch on its support can be observed from the outside of the case of the device through at least one electronic shutter activated or an optical valve activated to be in a transparent state, whereas in the measurement position, the electronic shutter or the optical valve is deactivated to be made opaque.

11 Claims, 3 Drawing Sheets

DEVICE FOR WINDING OR SETTING AND FOR VERIFYING A WATCH

CROSS-REFERENCE TO RELATED APPLICATION

This application claims priority to European Patent Application No. 21176611.8 filed on May 28, 2021, the entire disclosure of which is hereby incorporated herein by reference.

TECHNICAL FIELD OF THE INVENTION

The invention relates to a device for winding or setting and for verifying a mechanical watch for example with automatic, or electromechanical winding, or even a horological mechanical movement. The winding or setting device comprises at least one support on which the watch or the horological mechanical movement is disposed. The support can be driven in particular in rotary movements by a motorised arrangement to allow to carry out a recharge of the source of energy, which is generally a barrel with a spring.

PRIOR ART

In the field of electromechanical watches provided with hands, systems for correcting the time displayed by the watch are known. Such systems allow to reset the watch to the correct time, for example in the case of a change in time zone or a change between summer/winter time.

Such a system for correcting the time is for example described in the patent application EP 1 553 469 A1. The system is provided with a device for instruction of correction of the time, comprising according to one embodiment a computer connected to a camera and to a circuit for generating a signal for correcting the time. The watch comprises communication means to receive data for correction of the time contained in this signal, and means for moving the hands to the exact time. The watch can be placed on a support with the indication of the time by the hands visible on top, and the camera can take a photograph of the position of the hands, which is sent to the computer to recognize the time displayed by the watch. The computer thus generates correction data comprising a reference time, and transmits this data to the watch, via the circuit for generating a signal. However, a disadvantage of such a system is that it imposes a modification of the movement of the watch, in order to integrate therein communication means and means for moving the hands. Such a system is bulky and constraining, with the need for a computer for the correction of the time. Furthermore, a lack of precision is observed, since for the verification of the time displayed by the watch, the watch placed on the support is not in a chamber or case sheltered from the outside light, which can cause reading errors.

In order to overcome the aforementioned disadvantage, watch presentation-cases adapted to receive a watch on a support and comprising means for resetting the watch to the correct time are known. For this purpose, the patent application WO 2012/126978 A1, which describes such a presentation-case, can be cited. According to a specific embodiment, the presentation-case described in this document comprises a removable support that receives the watch and a device for winding the watch connected to a camera. The winding device comprises data-analysis means. Once the watch is placed on the removable support of the presentation-case, the camera records an image of the position of the hands, and sends it to the analysis means. The latter thus determine the time displayed by the watch and, by comparison to a reference time, transmit an instruction for correction of the time to the winding device. The winding device thus allows to wind the watch by direct mechanical action on its crown-winding-stem. The presentation-case is mechanically complex, and limited to the resetting to the correct time of watches having a crown-winding-stem. Once disposed in the closed presentation-case, nothing is provided to allow to see the watch from the outside in periods without measurement.

The patent EP 3 339 984 B1 describes a device for winding watches, which comprises a motor generating the winding, means for acoustic measurement of the oscillator of the watch on its support in the winding position, and control means for analysing the signals transmitted by the measurement means in order to adjust the running of the motor by throwing it into gear when the running amplitude of the oscillator is less than a minimum value, and by stopping it when the running amplitude is greater. The acoustic measurement means are fastened in a base. Nothing is provided relating to a measurement by a system for viewing the time displayed by the watch in a case sheltered from the outside light, so as to correct the time in the case. Moreover, there is not the possibility of seeing the watch from the outside in periods without measurement.

SUMMARY OF THE INVENTION

The goal of the invention is therefore to provide a device for winding or setting and for verifying a mechanical watch in particular with automatic, or electromechanical winding, or a horological mechanical movement, allowing to see the watch or the mechanical movement in a position without measurement from the outside of the case of the device while overcoming the aforementioned disadvantages of the prior art. Moreover, the device comprises a vision system for verifying the state of the watch in a measurement position to provide measurement signals in particular to an electronic circuit for processing the data to be able to carry out a resetting of the mechanical or electromechanical watch or of the horological movement to the correct time.

For this purpose, the invention relates to a device for winding or setting and for verifying a watch, such as a mechanical watch in particular with automatic winding or a horological mechanical movement, which comprises the features defined in independent claim 1.

Particular forms of the device are defined in dependent claims 2 to 11.

One advantage of the device for winding or setting and for verifying the mechanical watch preferably with automatic winding lies in the fact that it comprises a well-known vision system to verify the time displayed by the watch, when said watch is moved or placed into a measurement in the vision system, sheltered from the light coming from the outside of the case. Once the measurement has been carried out and the watch was able to be reset to the correct time by specific means for resetting to the correct time outside of the vision system, the watch on its support is moved or placed into a position without measurement. In this position without measurement, the watch or the horological movement can be seen from the outside of the case through an electronic shutter or an optical valve in a transparent state. In an alternative embodiment, the vision system can be moved after the measurement into a position without measurement in the case instead of moving the support with the watch. In this position without measurement, the case comprises an optical valve or an electronic shutter on a face of the case to see the watch in its position without measurement on its support.

Advantageously, in the position without measurement, the watch on its support is disposed according to an axis non-coaxial to the axis of the vision system during the verification and the resetting of the watch to the correct time. In this position without measurement, the watch is disposed to be seen from the outside through the optical valve or the electronic shutter, which can be activated electronically. In an activated state, the optical valve or the electronic shutter is transparent to see the watch inside the case in its position without measurement. However, in a measurement position in the optical system, the electronic shutter or the optical valve is in an opaque state to not disturb the measurement in the vision system.

BRIEF DESCRIPTION OF THE DRAWINGS

The goals, advantages and features of the device for winding or setting and for verifying a mechanical watch, in particular with automatic, or electromechanical winding will be clearer in the following description on the basis of non-limiting embodiments illustrated by the drawings in which.

DETAILED DESCRIPTION OF THE INVENTION

In the following description, reference is made to a device for winding or setting and for verifying a mechanical watch in particular with automatic, or electromechanical, winding, or a horological movement. All the electronic or optical components of the device, which are well known to a person skilled in the art in this technical field, are only described in a simplified manner. Even if an electromechanical watch or a horological mechanical movement mounted in the device on a support is involved, by simplification in the rest of the description, reference is mainly only made to a mechanical watch for example with automatic winding.

Figure 1A:
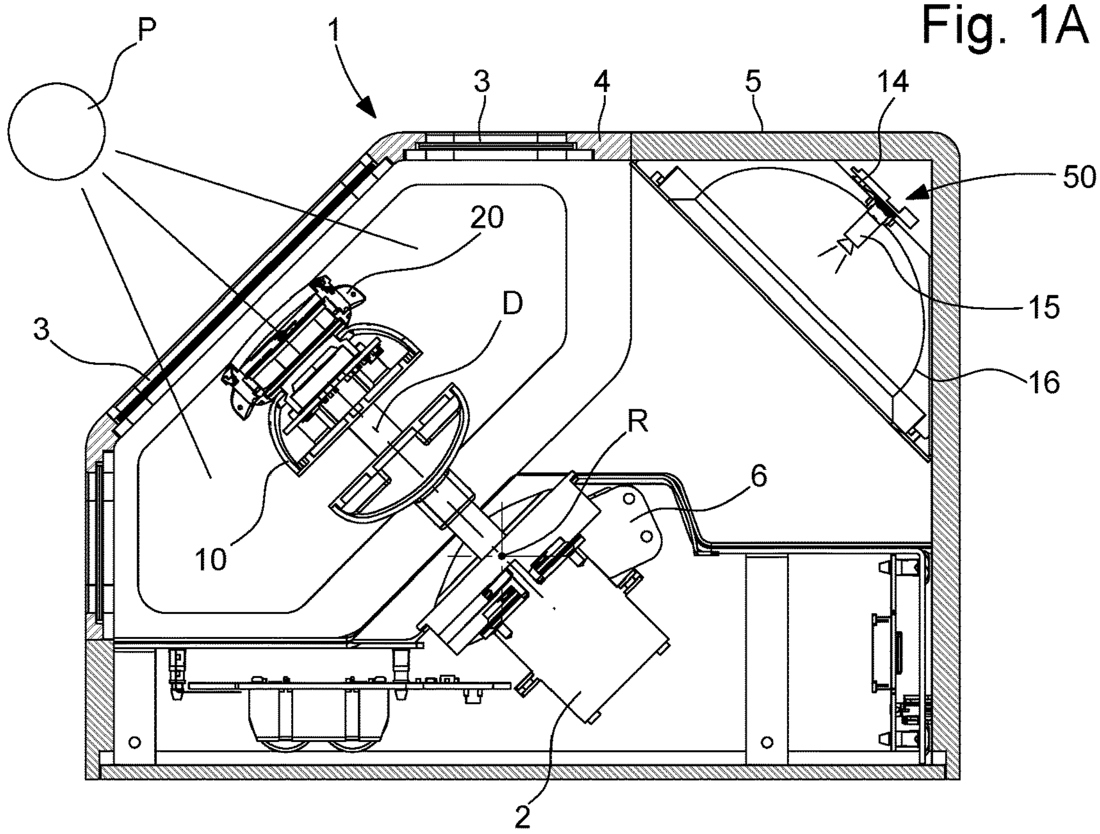
FIGS. 1A and 1B show a schematic transverse cross-section of a first embodiment of a device for winding or setting and for verifying a mechanical or electromechanical watch or a horological movement according to the invention on the one hand in a position without measurement and on the other hand in a measurement position.
Figure 1B:
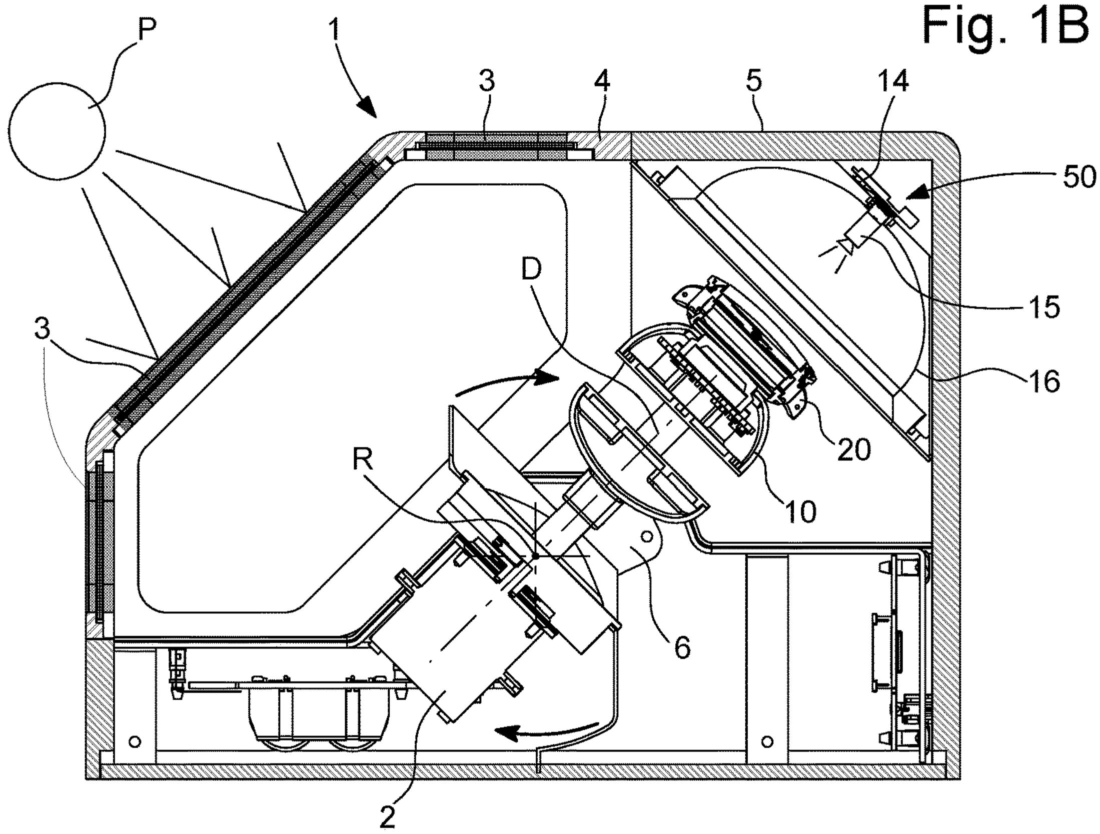

FIGS. 1A and 1B show a first embodiment of a device 1 for winding or setting and for verifying a mechanical or electromechanical watch 20 or a horological movement. The watch 20 can be disposed on a support 10, which can be moved from a first position, which is a position without measurement, to a second position, which is a measurement position in a vision system 50. The movement from the position without measurement shown in FIG. 1A to the measurement position shown in FIG. 1B is preferably carried out automatically by a drive means in the case, which is for example a unit with a rotary motor, and vice versa. Preferably, in the position without measurement, the vision system 50 is turned off. The support 10 of the watch 20 or of the horological movement can be generally driven in rotation in particular if the mechanical watch 20 has automatic winding. Motorisation means 2 comprising at least one electric motor are connected by an axis D to the watch 20 support 10 defining a watch carrier so as to drive it in rotation mainly in a position without measurement, but also possible in a measurement position in the vision system 50.

The watch 20 on its support 10 and the vision system 50 for the measurement of the state of the mechanical watch 20 are placed in a case 4, 5, which can have an overall rectangular parallelepipedic shape. This case can comprise a first part 4 on or through which at least one optical shutter 3 or at least one optical valve 3 can be placed, and a second base part 5 on which the first part 4 is mounted. The first part 4 of the case can be mounted or fastened by interlocking or clicking together on an opening of the second base part 5 to close the case. However, as not shown in detail in FIGS. 1A and 1B, the first part 4 can be mounted in rotation or with pivoting on the opening of the second part 5 of the case by a hinge or articulation. In this alternative embodiment, this facilitates the opening and the closing of the case for the mounting of the watch 20 on its support 10.

Once the watch 20 is placed on its support 10 and in a position without measurement, it can be observed in particular by a person P from the outside of the device 1 through the optical shutter 3 or optical valve 3, which is electronically made transparent in this position without measurement. However, in a measurement position of the watch 20 in the vision system 50, the optical shutter 3 or optical valve 3 is made opaque so as to guarantee a good measurement in the vision system 50 of the state of the watch 20.

For the movement of the first embodiment of the watch 20 support 10 of the device 1 from the position without measurement to the measurement position, a unit with a rotary motor mounted on a support plate 6 fastened in the case allows to rotate the support 10 according to an axis of rotation R perpendicular to the axis D of the support 10. The axis of rotation R is preferably located at motorisation means 2 of the axis D of the support 10 driving the mechanical watch 20 in such a way as to carry out an automatic winding of said watch even in a position without measurement. Preferably, the watch carrier, which comprises in particular the watch 20 on its support 10 connected by the axis D to the motorisation means 2, is rotated according to the axis of rotation R from the position without measurement to the measurement position or vice versa. The watch carrier is switched or rotated from the position without measurement to the measurement position in which a detection of the state of the watch 20 is carried out by the vision system 50, which provides measurement signals to an electronic circuit with a processing unit with the goal of controlling a resetting of said watch 20 to the correct time by specific means for resetting to the correct time outside of the 50. In the measurement position, the state of the watch is determined in several minutes. This means that a large part of the time the watch 20 is visible in the position without measurement through the electronic shutter 3 or the optical valve 3 made transparent in this position without measurement.

It should be noted that the mechanical watches 20 with automatic winding discharge when they are not carried. Smart winding-mechanisms generally solve this problem by imposing on them a movement that rotates the oscillating mass for the rewinding of the barrel spring. It is known to use the soft oscillation of the watch defined as "pampering" at the specific frequency of a spiral balance of the mechanical watch, which allows the running or operation to be controlled by the precision of the quartz provided in the smart winding-mechanism. It is possible to have small corrections if the pampering frequency does not exceed a certain typical value for example +/−30 seconds per day. If the state of the watch is well known, it is possible to directly set said watch to the correct time, but the time for resetting the watch to the correct time by this principle can be rather long (several hours). To do this, in such a way as to know first of all the state of the watch 20, a vision system 50 is used. This vision system 50 is mainly composed of one or more light sources 14, which are for example light-emitting diodes, a dome 16 and at least one camera 15 disposed in the dome 16 in a direction of an axis D of the support 10 carrying the watch 20 to be verified. Preferably, the camera 15 is disposed centrally in the top of the dome 16 according to the axis D of rotation of the support 10 carrying the watch 20 to be measured in the measurement position. The light source(s) 14 are disposed for annular lighting around the camera 15 to illuminate the watch 20 on the dial side with mainly the hands for indicating the time disposed on the dial. The goal of the annular lighting 14 with the dome 16 of the vision system 50 is to not create any shade and no reflection to carry out the measurement and define the state of the watch.

The vision system 50 is provided to provide measurement signals relative to the state of the watch. These measurement signals are transmitted to a processing unit with a processor in an electronic circuit for processing the signals not shown outside of the vision system 50, or disposed in the watch 20 support 10, which can still be provided. This allows to identify or determine the detected displayed time of the hands and thus allows an automatic setting of the time indicated by the watch by specific means for resetting to the correct time outside of the vision system. A connection to a power supply voltage of the electronic circuit and of the vision system is necessary, and a power supply provided by the conventional power grid can be used.

All this is well known, in particular defined in the patent EP 3 572 887 B1 which is incorporated here by reference and will not be described in detail in the present invention given that the goal of the present invention is mainly to be able to view the watch from the outside when it is in a position without measurement. This patent EP 3 572 887 B1 describes a device for winding and resetting to the correct time a mechanical or automatic watch disposed on a support in the device. A vision system is used and there can also be a microphone allowing to evaluate the frequency and the running of the watch in its measurement position, and also the amplitude of the spiral balance. A processing unit with a processor or state-control means are provided in an electronic circuit directly linked to the vision system or in a link to the watch 20 support 10.

The electronic circuit further comprises a program for control of all the motorisation means or unit with a rotary motor disposed in the case 4, 5 for an automatic control of the movement of the watch 20 support 10 or of the vision system 50 from the position without measurement to the measurement position or from the measurement position to the position without measurement. In general, the device 1 is only in a measurement position for several minutes per day, which means that a large part of the time the watch 20 on the support 10 is in the position without measurement of the device 1 allowing to easily view the watch practically all the time in a day.

The case can be made from a metal or ceramic material or a combination of ceramic and of metal, or even made from hard plastic. The optical valve 3 or the electronic shutter 3, which is disposed on the first part 4 of the case, is connected by metal wires to the processing unit of the vision system 50 or in the watch 20 support 10. The electronic shutter 3 or the optical valve 3 can preferably be disposed on at least one inclined surface of the first part 4 of the case. The surface on which the electronic shutter 3 or the optical valve 3 is disposed is preferably perpendicular to the axis D for driving the watch 20 support 10 in the position without measurement. This axis D as shown in FIG. 1A of the position without measurement of the device 1 is of course non-coaxial to the axis of measurement of the vision system 50, when the device 1 is in a measurement position as shown in FIG. 1B.

The dimension of the electronic shutter 3 or of the optical valve 3 must preferably be greater than the diameter or the dimension of the dial of the watch 20 exposed to allow good vision of said watch 20 for a person P looking at it from the outside of the case 4, 5 of the device 1. Preferably, according to the first embodiment of the device 1, the electronic shutter 3 or the optical valve 3 occupies most of the first part 4 of the case. The electronic shutter 3 or the optical valve 3 can even be distributed in continuity on a vertical face and on a horizontal face while linked on each side to the inclined face. In these conditions the dimension of the electronic shutter 3 or of the optical valve 3 has a dimension greater than double the visible dimension of the watch 20 in the case.

It is clear that the motorisation means or the unit with a rotary or linear motor described above are preferably composed of electric motors, but it is possible to use other motors to carry out the expected functions.

Figure 2A:
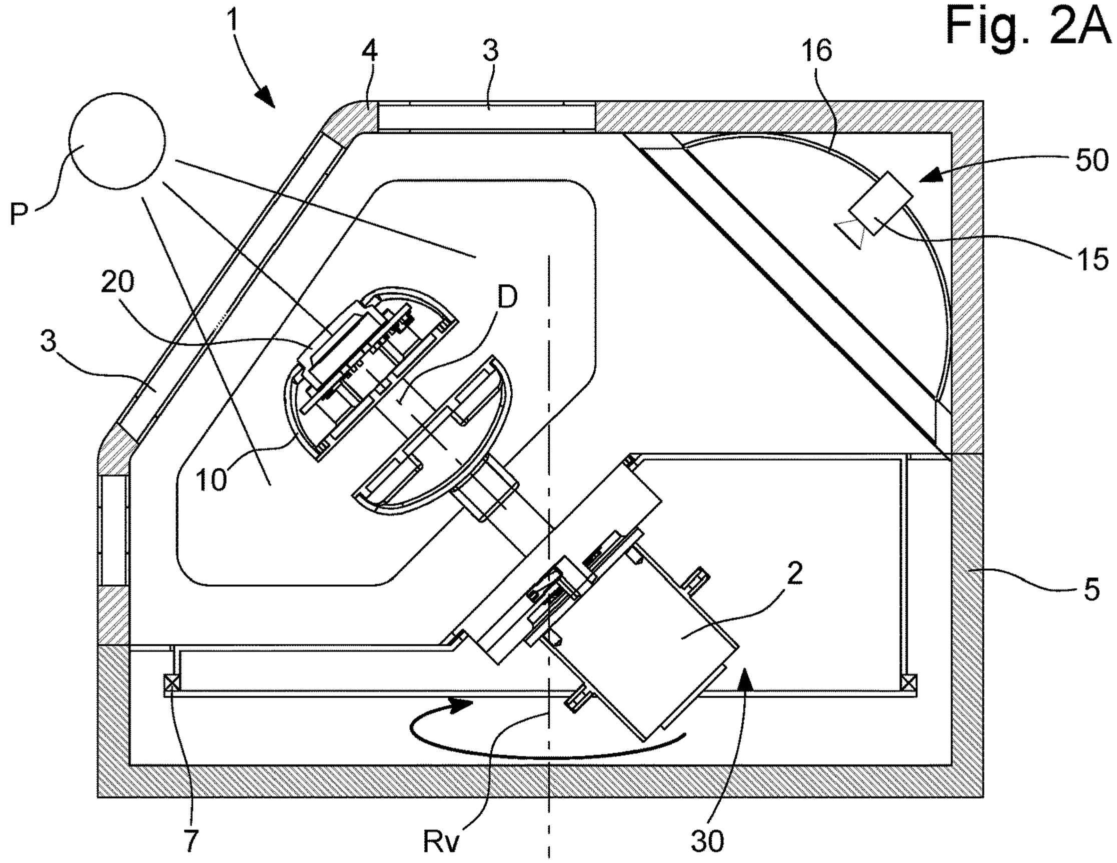
FIGS. 2A and 2B show a schematic transverse cross-section of a second embodiment of a device for winding or setting and for verifying a mechanical or electromechanical watch or a horological movement according to the invention on the one hand in a position without measurement and on the other hand in a measurement position.
Figure 2B:
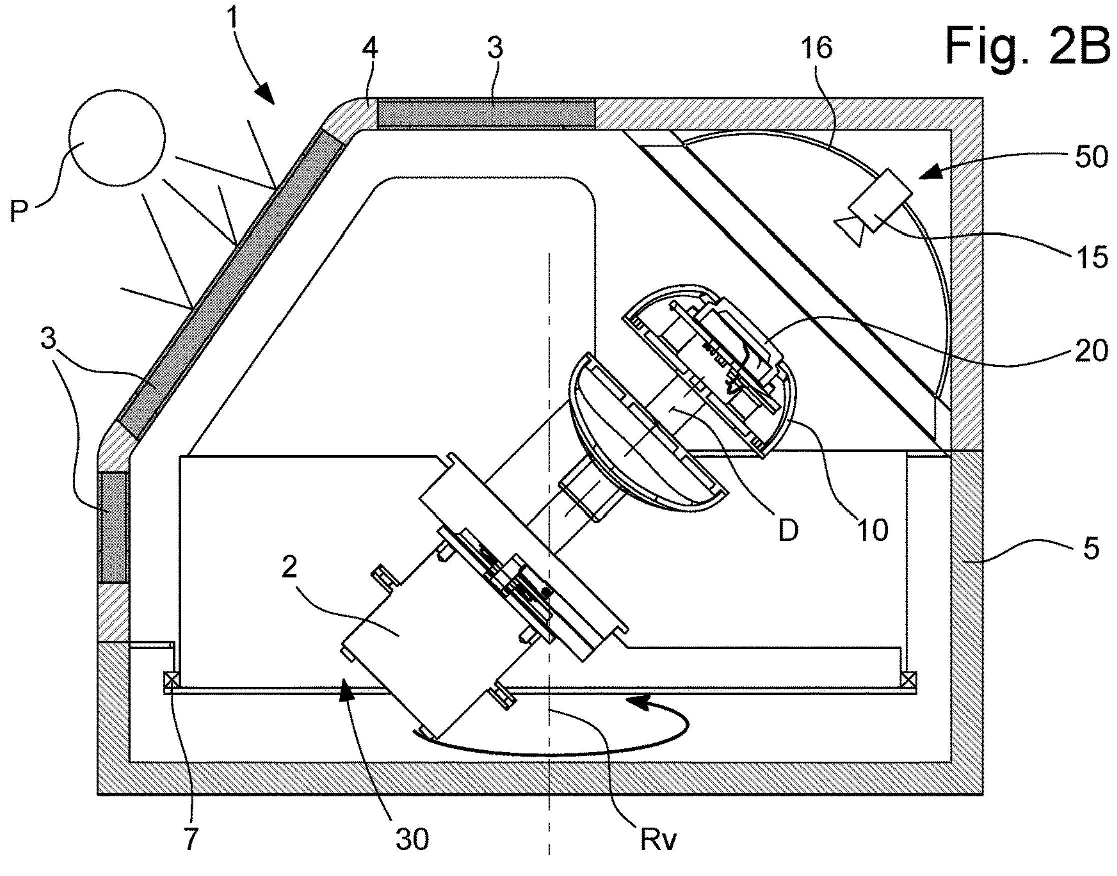

FIGS. 2A and 2B show a second embodiment of a device 1 for winding or setting and for verifying a watch 20 or a horological movement. This second embodiment differs from the first embodiment mainly by an assembly 30 on which the watch carrier is mounted with the support 10 of the watch 20. The motorisation means 2 are connected to the watch 20 support 10 by an axis D allowing to continuously rotate the watch 20 on its support 10, if it is a watch 20 with automatic winding.

The watch carrier assembly 30 is movably mounted on an inner base of the second part 5 of the case. Preferably the watch carrier assembly 30 is rotatably mounted on the inner base of the second part 5 of the case. It is also possible to fasten the watch carrier assembly 30 to an inner side of a ball bearing 7, whereas an outer side of the ball bearing 7 is fastened onto the inner base of the second part 5 of the case. Thus the watch carrier assembly 30 can be driven in rotation according to a vertical axis of rotation Rv from the inner base by a motor not shown, which is preferably an electric motor.

The watch carrier assembly 30 can thus easily be driven in rotation from the position without measurement shown in FIG. 2A to the measurement position in the vision system shown in FIG. 2B. Like for the first embodiment, once the watch 20 is on its support 10. The electronic shutter 3 or the optical valve 3 is activated to be transparent in the position without measurement of the watch carrier assembly 30, whereas in the measurement position of the watch carrier assembly 30, the electronic shutter 3 or the optical valve 3 is deactivated to be in an opaque state in order to not disturb the measurement in the vision system 50.

The arrangement of the electronic shutter 3 or of the optical valve 3 is similar to that which was described in the first embodiment above. However, the first part 4 of the case can have a larger dimension corresponding approximately to half of the total dimension of the case and thus corresponds approximately to the dimension of the second part 5 of the case. In this case, the first part 4 of the case can be rotatably mounted by hinges or articulations on the second part 5 of the case to be in an open position for the mounting of the watch 20 on the support 10 or a sealed closed position with the first part 4 closing the second part 5 of the case.

Figure 3A:
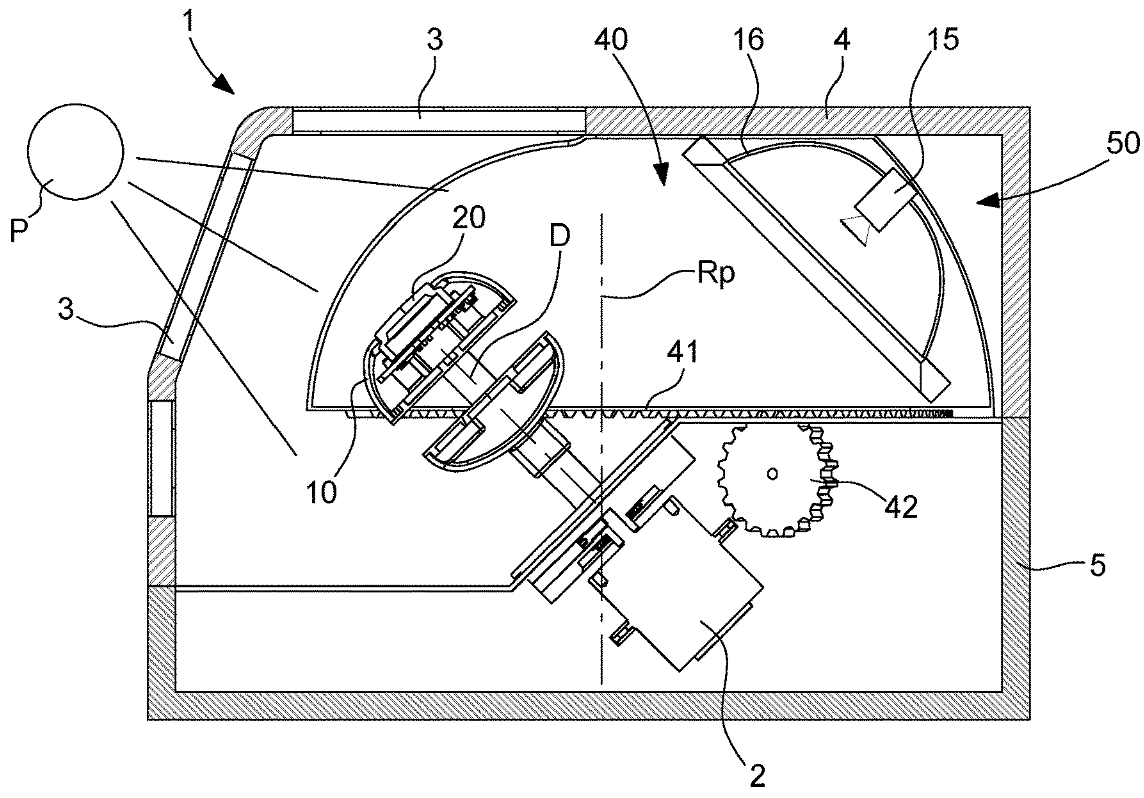
FIGS. 3A and 3B show a schematic transverse cross-section of a third embodiment of a device for winding or setting and for verifying a mechanical or electromechanical watch or a horological movement according to the invention on the one hand in a position without measurement and on the other hand in a measurement position.
Figure 3B:
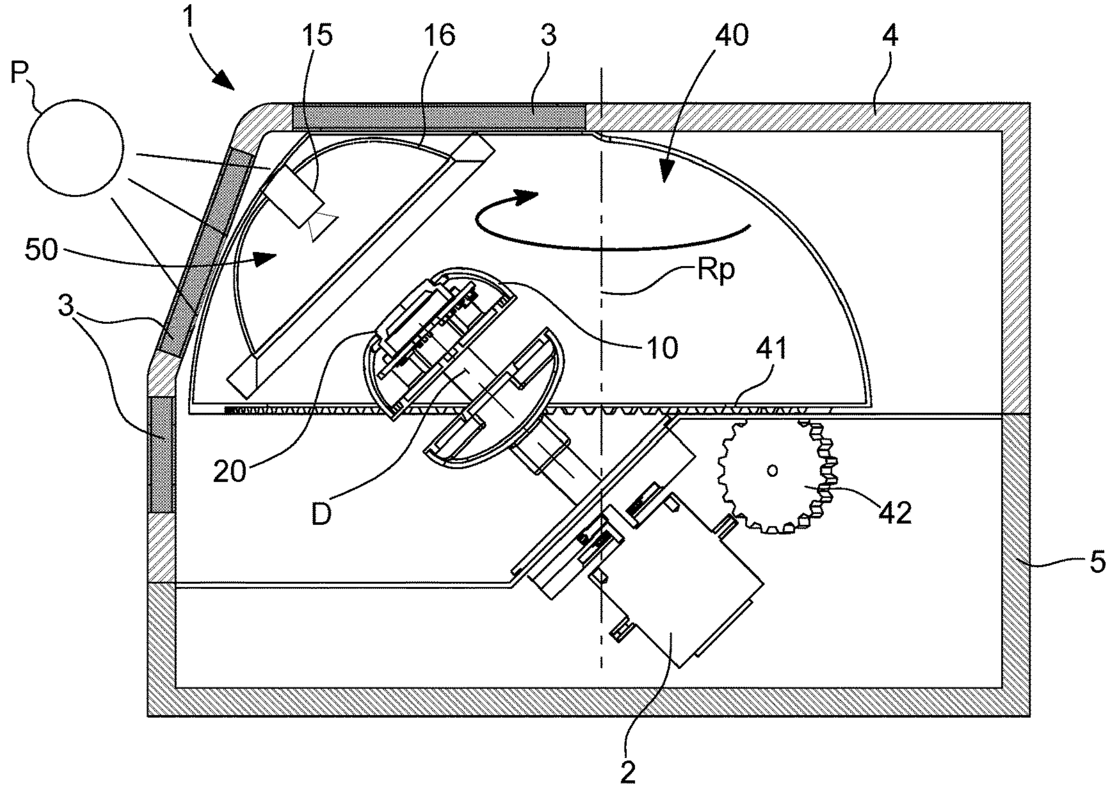

FIGS. 3A and 3B show a third embodiment of a device 1 for winding or setting and for verifying a mechanical watch 20 or a horological movement. This third embodiment differs from the first and second embodiments mainly by the fact that the watch carrier with the watch 20 support 10 connected by an axis D to the motorisation means 2 does not move from the position "without measurement" to the "measurement" position. In these conditions, it is an assembly 40 with a vision system 50 that is rotatably mounted according to a vertical axis Rp in the case and mainly located in the first part 4 of the case. The assembly 40 with a vision system 50 comprises at its base at least one circular portion 41 toothed on the periphery, which is capable of being driven in rotation by a toothed wheel 42 connected to an electric drive motor not shown.

The assembly 40 with a vision system 50 must be provided to move the vision system 50 from a first position corresponding to the position without measurement of the device to a second position corresponding to the measurement position. In the position without measurement, the vision system 50 is opposite to the portion of the first part 4 of the case in which the electronic shutter 3 or the optical valve 3, which is activated to be transparent as shown in FIG. 3A, is located. However, in the measurement position, the vision system 50 is rotated to be located facing the electronic shutter 3 or the optical valve 3, which is in this case made opaque.

The case can be the same as that described in the second embodiment. The electronic shutter 3 or the optical valve 3 can be disposed partly on or through an inclined face of the first part 4 of the case and have other portions connected by electric wires disposed on a vertical face and a horizontal face of the first part 4 of the case.

With regard to the electronic shutter 3 or the optical valve 3, it can be used of the embodiment described in the Swiss patent application CH 712 212 A2. This Swiss patent application mainly describes an optical device composed of two liquid crystal cells superimposed and controlled in such a way as to go from a transparent state to an opaque state, and vice versa. In any case, the embodiment of both the electronic shutter or the optical valve to have these two transparent and opaque states are well known from the prior art and can be controlled by the electronic circuit described above.

It should be noted that a movement by a rotary movement from a position without measurement to a measurement position either of the watch carrier or of an assembly comprising it, or of an assembly with a vision system, has mainly been described. But it is also possible in order to go from the position without measurement to the measurement position or vice versa to have a linear movement of the watch carrier or of the assembly with a vision system, but this certainly complicates the carrying out thereof.

On the basis of the description that has just been given in relation to the device for winding or setting and for verifying a mechanical or electromechanical watch, or a horological mechanical movement, multiple embodiments of the device can be carried out without going beyond the context of the invention defined by the claims.

The invention claimed is:

1. A device for winding or setting and for verifying a mechanical or electromechanical watch, or a horological movement, the device comprising a case composed of a first part and of a second part fastened or maintained to one another to close the case, the case enclosing in an inner space a support to receive at least one watch and at least one vision system to carry out a measurement of the state of the watch or of the horological movement in such a way as to reset the watch or the horological movement to the correct time after the processing, outside of the vision system, in an electronic circuit of the measurement signals coming from the vision system, the vision system comprising one or more light sources to illuminate the watch on its support, a dome and at least one camera disposed in the dome in a direction of an axis of the support carrying the watch to be verified, wherein the watch support or the vision system is arranged in such a way as to be automatically moved by a drive means in the case from a position without measurement to a measurement position of the watch or from a measurement position of the watch to a position without measurement, wherein in the position without measurement of the device, a watch or a horological movement placed on the support can be seen from the outside of the case through an electronic shutter activated or an optical valve activated to be in a transparent state, whereas in the measurement position, the electronic shutter is deactivated or the optical valve is deactivated to be in an opaque state, the electronic shutter or the optical valve being disposed on or through at least one face of the first part of the case, and controlled by the electronic circuit in the case.

2. The device for winding or setting and for verifying a mechanical watch with automatic winding according to claim 1, wherein motorisation means are connected by an axis to the watch support defining a watch carrier so as to be able to drive it in rotation at least into the position without measurement.

3. The device for winding or setting and for verifying a watch according to claim 2, wherein the watch carrier is arranged to be moved from the position without measurement to the measurement position or from the measurement position to the position without measurement by a unit with a rotary motor mounted on a support plate and controlled by the electronic circuit in the case, allowing to rotate the watch carrier according to an axis of rotation perpendicular to the axis of the watch carrier, in the measurement position, the axis of the support being coaxial to the axis of the dome with the camera of the vision system, the axis of rotation being disposed near the motorisation means.

4. The device for winding or setting and for verifying a watch according to claim 1, wherein the electronic shutter or the optical valve is disposed on or through at least one inclined face of the first part of the case, which has an overall rectangular parallelepipedic shape.

5. The device for winding or setting and for verifying a watch according to claim 4, wherein the electronic shutter or the optical valve is disposed partly on a vertical face and on a horizontal face while linked on each side to the inclined face of the first part of the case.

6. The device for winding or setting and for verifying a watch according to claim 5, wherein the electronic shutter or the optical valve is composed of three parts disposed respectively on the vertical face, the inclined face and the horizontal face of the first part of the case, the three parts of the electronic shutter or of the optical valve being electrically connected to one another and to the electronic circuit in the case.

7. The device for winding or setting and for verifying a watch according to claim 1, wherein the watch support is arranged to be moved from the position without measurement to the measurement position or from the measurement position to the position without measurement by a unit with a rotary motor mounted on a support plate and controlled by the electronic circuit in the case, thereby allowing the rotation of the support according to an axis of rotation perpendicular to the axis of the support such that in the measurement position, the axis of the support is coaxial to the axis of the dome with the camera of the vision system.

8. The device for winding or setting and for verifying a watch according to claim 1, wherein an assembly comprising at least the watch support or the watch carrier with the motorisation means is movably mounted on an inner base of the second part of the case, the assembly being rotatably mounted on the inner base according to a vertical axis of rotation for the passage from the position without measurement to the measurement position and vice versa.

9. The device for winding or setting and for verifying a watch according to claim 8, wherein the watch carrier assembly is rotatably mounted on the inner base of the second part of the case via a ball bearing.

10. A device for winding or setting and for verifying a mechanical or electromechanical watch, or a horological movement, the device comprising a case composed of a first part and of a second part fastened or maintained to one another to close the case, the case enclosing in an inner space a support to receive at least one watch and at least one vision system to carry out a measurement of the state of the watch or of the horological movement in such a way as to reset the watch or the horological movement to the correct time after the processing, outside of the vision system, in an electronic circuit of the measurement signals coming from the vision system, the vision system comprising one or more light sources to illuminate the watch on its support, a dome and at least one camera disposed in the dome in a direction of an axis of the support carrying the watch to be verified, wherein an assembly comprising at least the vision system is rotatably mounted to rotate around a vertical axis in the case and relative to the case while the case is closed, and mainly located in the first part of the case.

11. The device for winding or setting and for verifying a watch according to claim 10, wherein the watch carrier or the watch support does not move when the vision system is rotated, wherein the assembly with a vision system comprises at its base at least one circular portion toothed on the periphery capable of being driven in rotation by a toothed wheel connected to an electric drive motor so as to move the assembly with a vision system in rotation from the measurement position to the position without measurement and vice versa, wherein in the measurement position, the vision system is placed above the watch support in a manner coaxial to the axis of the support.

* * * * *